(12) United States Patent
Miller et al.

(10) Patent No.: US 10,375,241 B2
(45) Date of Patent: Aug. 6, 2019

(54) SYSTEM AND METHOD FOR AUTOMATIC QUALITY MANAGEMENT IN A CONTACT CENTER ENVIRONMENT

(71) Applicant: GENESYS TELECOMMUNICATIONS LABORATORIES, INC., Daly city, CA (US)

(72) Inventors: Derek M. Miller, Indianapolis, IN (US); Taylor Brennan, Indianapolis, IN (US)

(*) Notice: Subject to any disclaimer, the term of this patent is extended or adjusted under 35 U.S.C. 154(b) by 0 days.

(21) Appl. No.: 15/713,342

(22) Filed: Sep. 22, 2017

(65) Prior Publication Data
US 2018/0091654 A1    Mar. 29, 2018

Related U.S. Application Data

(60) Provisional application No. 62/398,565, filed on Sep. 23, 2016, provisional application No. 62/453,570, filed on Feb. 2, 2017.

(51) Int. Cl.
| | |
|---|---|
| *H04M 3/51* | (2006.01) |
| *G06Q 50/20* | (2012.01) |
| *H04M 3/42* | (2006.01) |
| *G06Q 10/06* | (2012.01) |
| *G06F 7/02* | (2006.01) |
| *G06N 5/04* | (2006.01) |
| *H04M 3/22* | (2006.01) |

(52) U.S. Cl.
CPC .......... *H04M 3/5175* (2013.01); *G06F 7/02* (2013.01); *G06N 5/04* (2013.01); *G06Q 10/06398* (2013.01); *G06Q 50/2057* (2013.01); *H04M 3/2281* (2013.01); *H04M 3/42221* (2013.01); *H04M 2201/18* (2013.01); *H04M 2203/402* (2013.01); *H04M 2203/403* (2013.01)

(58) Field of Classification Search
CPC .. H04M 3/51; H04M 3/5175; H04M 3/42221; H04M 2203/401; H04M 2203/402
USPC .............. 379/265.07, 266.1, 265.03, 265.06
See application file for complete search history.

(56) References Cited

U.S. PATENT DOCUMENTS

| | | | |
|---|---|---|---|
| 8,649,499 B1 * | 2/2014 | Koster | ................ H04M 3/5175 379/265.06 |
| 9,178,999 B1 | 11/2015 | Hegde et al. | |
| 9,538,007 B1 | 1/2017 | Mariappan | |

(Continued)

FOREIGN PATENT DOCUMENTS

WO    2014081595 A1    5/2014

OTHER PUBLICATIONS

International Search Report and Written Opinion for Application No. PCT/US2017/053048, dated Apr. 9, 2018, 12 pages.

*Primary Examiner* — Thjuan K Addy

(57) ABSTRACT

A method for automatically managing a recorded interaction between a customer and an agent of a contact center includes: extracting, by a processor, features from the recorded interaction; computing, by the processor, a score of the recorded interaction by supplying the features to a prediction model; detecting, by the processor, a condition based on the score; matching, by the processor, the condition with an action; and controlling, by the processor, a workforce management server to assign a training session to the agent of the contact center.

20 Claims, 8 Drawing Sheets

(56) References Cited

U.S. PATENT DOCUMENTS

| | | |
|---|---|---|
| 2007/0071206 A1* | 3/2007 | Gainsboro .......... H04M 3/2281 |
| | | 379/168 |
| 2007/0250318 A1 | 10/2007 | Waserblat et al. |
| 2011/0033036 A1 | 2/2011 | Edwards et al. |
| 2011/0307257 A1 | 12/2011 | Pereg et al. |
| 2014/0136194 A1 | 5/2014 | Warford |
| 2015/0178371 A1 | 6/2015 | Seth et al. |
| 2017/0195487 A1 | 7/2017 | Bellosi |
| 2018/0091653 A1 | 3/2018 | Miller et al. |

* cited by examiner

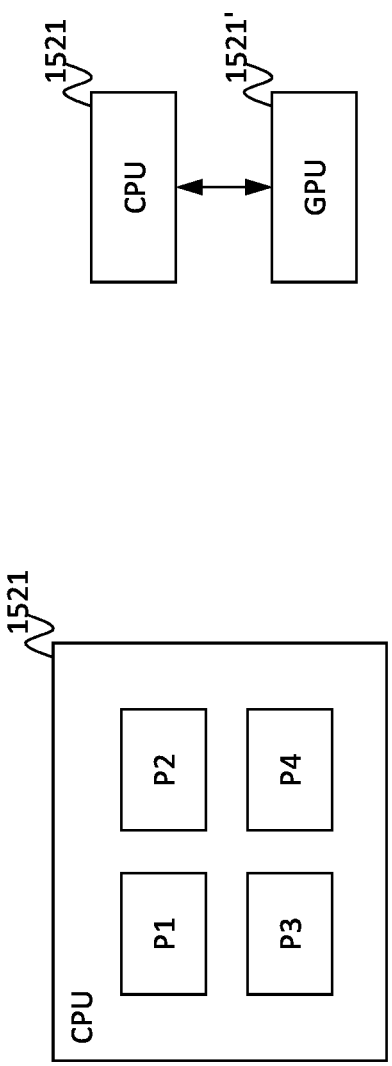

SYSTEM AND METHOD FOR AUTOMATIC QUALITY MANAGEMENT IN A CONTACT CENTER ENVIRONMENT

CROSS-REFERENCE TO RELATED APPLICATION(S)

This application claims the benefit of U.S. Provisional Patent Application No. 62/398,565, filed in the United States Patent and Trademark Office on Sep. 23, 2016 and the benefit of U.S. Provisional Patent Application No. 62/453,570, filed in the United States Patent and Trademark Office on Feb. 2, 2017, the entire disclosures of which are incorporated by reference herein.

FIELD

Aspects of embodiments of the present invention relate to the field of systems and methods for operating contact centers, in particular, systems and methods for automatically computing scores of agent behavior based on analyzing interactions between customers and agents of a contact center and for managing contact center operations in accordance with the automatically computed scores.

BACKGROUND

Generally, a contact center is staffed with agents who serve as an interface between an organization, such as a company, and outside entities, such as customers. For example, human sales agents at contact centers may assist customers in making purchasing decisions and may receive purchase orders from those customers. Similarly, human support agents at contact centers may assist customers in resolving issues with products or services provided by the organization. Interactions between contact center agents and outside entities (customers) may be conducted by voice (e.g., telephone calls or voice over IP or VoIP calls), video (e.g., video conferencing), text (e.g., emails and text chat), or through other media.

Quality monitoring in contact centers refers to the process of evaluating agents and ensuring that the agents are providing sufficiently high quality service or meeting service standards. Generally, a quality monitoring process will monitor the performance of an agent by evaluating the interactions that the agent participated in for events such as whether the agent was polite and courteous, whether the agent was efficient, and whether the agent proposed the correct solutions to resolve a customer's issue.

SUMMARY

Aspects of embodiments of the present invention relate to systems and methods for automatically evaluating or scoring agent behavior based on analyzing interactions between customers and agents of a contact center and for managing contact center operations in accordance with the automatically computed scores.

According to one embodiment of the present invention, a method for automatically managing a recorded interaction between a customer and an agent of a contact center includes: extracting, by a processor, features from the recorded interaction; computing, by the processor, a score of the recorded interaction by supplying the features to a prediction model; detecting, by the processor, a condition based on the score; matching, by the processor, the condition with an action; and controlling, by the processor, a workforce management server to assign a training session to the agent of the contact center.

The condition may include comparing the score to a threshold corresponding to a failure to comply with agent performance standards.

The threshold may correspond to a predicted performance based on historical performance of the agent.

The threshold may be based on a Gaussian distribution of agents of the contact center and the score is computed as a z-score being below the threshold.

The score may be an aggregate of a plurality of automatically computed scores of a plurality of recorded interactions, the plurality of recorded interactions occurring during a time window.

The aggregate may correspond to a percentage of the recorded interactions during the time window that satisfy an individual interaction threshold condition, and the threshold may correspond to a percentage of recorded interactions satisfying the individual interaction threshold condition.

The training session may be selected from a plurality of training topics in accordance with the condition detected based on the score.

The score may be associated with script compliance and the training session may relate to script compliance.

The score may be associated with knowledge of a product line and the training session may relate to information regarding the product line.

According to one embodiment of the present invention, a system for automatically managing a recorded interaction between a customer and an agent of a contact center includes: a processor; and a memory storing instructions that, when executed by the processor, cause the processor to: extract features from the recorded interaction; compute a score of the recorded interaction by supplying the features to a prediction model; detect a condition based on the score; match the condition with an action; and control a workforce management server to assign a training session to the agent of the contact center.

The condition may include comparing the score to a threshold corresponding to a failure to comply with agent performance standards.

The threshold may correspond to a predicted performance based on historical performance of the agent.

The threshold may be based on a Gaussian distribution of agents of the contact center and the score is computed as a z-score being below the threshold.

The score may be an aggregate of a plurality of automatically computed scores of a plurality of recorded interactions, the plurality of recorded interactions occurring during a time window.

The aggregate may correspond to a percentage of the recorded interactions during the time window that satisfy an individual interaction threshold condition, and the threshold may correspond to a percentage of recorded interactions satisfying the individual interaction threshold condition.

The training session may be selected from a plurality of training topics in accordance with the condition detected based on the score.

The score may be associated with script compliance and the training session relates to script compliance.

The score may be associated with knowledge of a product line and the training session relates to information regarding the product line.

According to one embodiment of the present invention, a system for automatically managing a recorded interaction between a customer and an agent of a contact center includes: means for extracting features from the recorded interaction; means for computing a score of the recorded interaction by supplying the features to a prediction model; means for detecting a condition based on the score; means for matching the condition with an action; and means for controlling a workforce management server to assign a training session to the agent of the contact center.

The condition may include comparing the score to a threshold corresponding to a failure to comply with agent performance standards.

BRIEF DESCRIPTION OF THE DRAWINGS

The accompanying drawings, together with the specification, illustrate exemplary embodiments of the present invention, and, together with the description, serve to explain the principles of the present invention.

FIG. 5C is a block diagram of a computing device according to an embodiment of the present invention.

FIG. 5D is a block diagram of a computing device according to an embodiment of the present invention.

DETAILED DESCRIPTION

Figure 1:
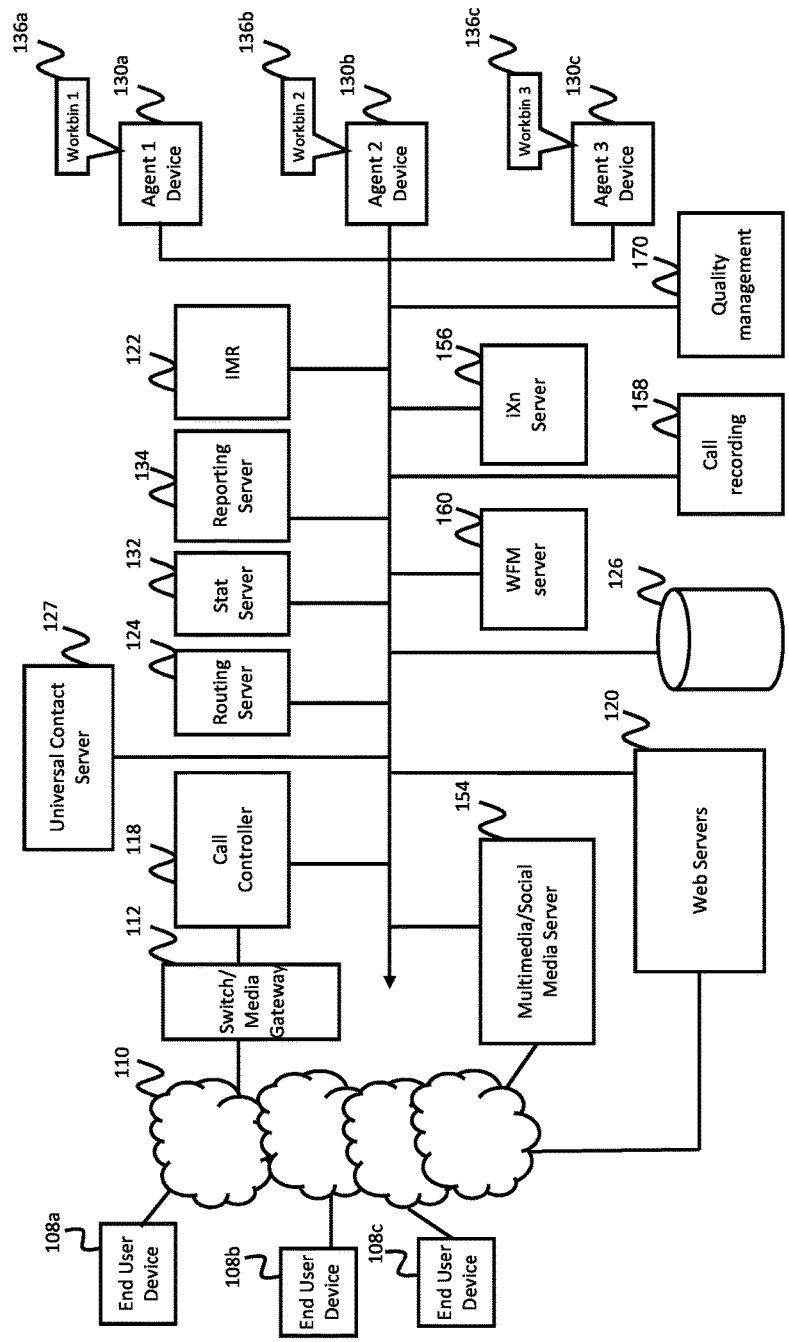
FIG. 1 is a schematic block diagram of a system for supporting a contact center in providing contact center services according to one exemplary embodiment of the invention.

Quality monitoring (QM) in a contact center refers to the process of evaluating agents to measure and ensure the quality of the service provided by the human agents. Typically, quality monitoring is performed to measure agent performance during interactions (e.g., calls, text chats, and email exchanges) between the agents and customers, such as whether the agent was polite and courteous, and to measure agent effectiveness, such as whether the agent was able to resolve the customer's issue and whether the agent was time efficient in doing so.

Generally, evaluations are performed manually by a human supervisor, who reviews an interaction, such as by listening to a voice call, reading a transcript of a text chat, or reading an email conversation thread, and then completes an evaluation form for the agent based on the review. The evaluation of the interaction may result in a score that reflects the agent's performance on that interaction. The score may be used, with other scores and/or other performance metrics, to compute one or more aggregate scores that may reflect the agent's overall performance. Individual scores or an aggregate score may be used to indicate that an agent has met, exceeded, or failed to meet particular standards of performance.

These manual agent evaluations can be time consuming and cumbersome to perform, and therefore, in most practical situations, only a small fraction of an agent's interactions will be evaluated by a human supervisor, and the vast majority of the agent interactions will go unevaluated. In some systems, interactions may be randomly selected (or sampled) for evaluation. However, most such sampled interactions will be "uninteresting" in that they merely demonstrate agent competence meeting performance standards. On the other hand, uncommon "interesting" interactions such as those containing instances of unusually good behavior or containing violations of company policy may go undetected if those interactions are not selected for human supervisor evaluation. In addition, assuming this ratio of uninteresting interactions to interesting interactions, most of the interactions stored in the mass storage device 126 by the call recording server 158 will be "uninteresting," thereby wasting storage space on interactions that do not provide meaningful or actionable data (e.g., because all of these interactions are merely at par, and therefore merely confirm typical performance levels).

As such, aspects of embodiments of the present invention are directed to systems and methods for assisting in a quality management system by automatically scoring interactions. The automatically computed scores may be used to classify the interactions as being uninteresting or interesting. Furthermore, the computed scores may be used to control a further action taken on the recorded interaction, such as assigning the interesting interactions to one or more human supervisors for manual evaluation, deleting uninteresting interactions, and preserving interesting interactions for further use.

In addition, the automatic scoring may be used to automate workforce management training and coaching. In particular, the automatic scoring may be used to track an agent's performance and to automatically schedule a training and/or coaching session for the agent based on an automatically computed score or scores.

Contact Center Overview

FIG. 1 is a schematic block diagram of a system for supporting a contact center in providing contact center services according to one exemplary embodiment of the invention. The contact center may be an in-house facility to a business or enterprise for serving the enterprise in performing the functions of sales and service relative to the products and services available through the enterprise. In another aspect, the contact center may be operated by a third-party service provider. According to some embodiments, the contact center may operate as a hybrid system in which some components of the contact center system are hosted at the contact center premise and other components are hosted remotely (e.g., in a cloud-based environment). The contact center may be deployed in equipment dedicated to the enterprise or third-party service provider, and/or deployed in a remote computing environment such as, for example, a private or public cloud environment with infrastructure for supporting multiple contact centers for multiple enterprises. The various components of the contact center system may also be distributed across various geographic locations and computing environments and not necessarily contained in a single location, computing environment, or even computing device.

According to one example embodiment, the contact center system manages resources (e.g. personnel, computers, and telecommunication equipment) to enable delivery of services via telephone or other communication mechanisms. Such services may vary depending on the type of contact center, and may range from customer service to help desk, emergency response, telemarketing, order taking, and the like.

Customers, potential customers, or other end users (collectively referred to as customers or end users, e.g., end users) desiring to receive services from the contact center may initiate inbound communications (e.g., telephony calls) to the contact center via their end user devices 108a-108c (collectively referenced as 108). Each of the end user devices 108 may be a communication device conventional in the art, such as, for example, a telephone, wireless phone, smart phone, personal computer, electronic tablet, and/or the like. Users operating the end user devices 108 may initiate, manage, and respond to telephone calls, emails, chats, text messaging, web-browsing sessions, and other multi-media transactions.

Inbound and outbound communications from and to the end user devices 108 may traverse a telephone, cellular, and/or data communication network 110 depending on the type of device that is being used. For example, the communications network 110 may include a private or public switched telephone network (PSTN), local area network (LAN), private wide area network (WAN), and/or public wide area network such as, for example, the Internet. The communications network 110 may also include a wireless carrier network including a code division multiple access (CDMA) network, global system for mobile communications (GSM) network, or any wireless network/technology conventional in the art, including but to limited to 3G, 4G, LTE, and the like.

According to one example embodiment, the contact center system includes a switch/media gateway 112 coupled to the communications network 110 for receiving and transmitting telephony calls between end users and the contact center. The switch/media gateway 112 may include a telephony switch or communication switch configured to function as a central switch for agent level routing within the center. The switch may be a hardware switching system or a soft switch implemented via software. For example, the switch 112 may include an automatic call distributor, a private branch exchange (PBX), an IP-based software switch, and/or any other switch with specialized hardware and software configured to receive Internet-sourced interactions and/or telephone network-sourced interactions from a customer, and route those interactions to, for example, an agent telephony or communication device. In this example, the switch/media gateway establishes a voice path/connection (not shown) between the calling customer and the agent telephony device, by establishing, for example, a connection between the customer's telephony device and the agent telephony device.

According to one exemplary embodiment of the invention, the switch is coupled to a call controller 118 which may, for example, serve as an adapter or interface between the switch and the remainder of the routing, monitoring, and other communication-handling components of the contact center.

The call controller 118 may be configured to process PSTN calls, VoIP calls, and the like. For example, the call controller 118 may be configured with computer-telephony integration (CTI) software for interfacing with the switch/media gateway and contact center equipment. In one embodiment, the call controller 118 may include a session initiation protocol (SIP) server for processing SIP calls.

According to some exemplary embodiments, the call controller 118 may, for example, extract data about the customer interaction such as the caller's telephone number, often known as the automatic number identification (ANI) number, or the customer's internet protocol (IP) address, or email address, and communicate with other CC components in processing the interaction.

According to one exemplary embodiment of the invention, the system further includes an interactive media response (IMR) server 122, which may also be referred to as a self-help system, virtual assistant, or the like. The IMR server 122 may be similar to an interactive voice response (IVR) server, except that the IMR server 122 is not restricted to voice, but may cover a variety of media channels including voice. Taking voice as an example, however, the IMR server 122 may be configured with an IMR script for querying customers on their needs. For example, a contact center for a bank may tell customers, via the IMR script, to "press 1" if they wish to get an account balance. If this is the case, through continued interaction with the IMR server 122, customers may complete service without needing to speak with an agent. The IMR server 122 may also ask an open ended question such as, for example, "How can I help you?" and the customer may speak or otherwise enter a reason for contacting the contact center. The customer's response may then be used by a routing server 124 to route the call or communication to an appropriate contact center resource.

If the communication is to be routed to an agent, the call controller 118 interacts with the routing server (also referred to as an orchestration server) 124 to find an appropriate agent for processing the interaction. The selection of an appropriate agent for routing an inbound interaction may be based, for example, on a routing strategy employed by the routing server 124, and further based on information about agent availability, skills, and other routing parameters provided, for example, by a statistics server 132.

In some embodiments, the routing server 124 may query a customer database, which stores information about existing clients, such as contact information, service level agreement (SLA) requirements, nature of previous customer contacts and actions taken by contact center to resolve any customer issues, and the like. The database may be, for example, Cassandra or any NoSQL database, and may be stored in a mass storage device 126. The database may also be a SQL database and may be managed by any database management system such as, for example, Oracle, IBM DB2, Microsoft SQL server, Microsoft Access, PostgreSQL, MySQL, FoxPro, and SQLite. The routing server 124 may query the customer information from the customer database via an ANI or any other information collected by the IMR server 122.

Once an appropriate agent is identified as being available to handle a communication, a connection may be made between the customer and an agent device 130a-130c (collectively referenced as 130) of the identified agent. Collected information about the customer and/or the customer's historical information may also be provided to the agent device for aiding the agent in better servicing the communication. In this regard, each agent device 130 may include a telephone adapted for regular telephone calls, VoIP calls, and the like. The agent device 130 may also include a computer for communicating with one or more servers of the contact center and performing data processing associated with contact center operations, and for interfacing with customers via voice and other multimedia communication mechanisms.

The contact center system may also include a multimedia/social media server 154 for engaging in media interactions other than voice interactions with the end user devices 108 and/or web servers 120. The media interactions may be related, for example, to email, vmail (voice mail through email), chat, video, text-messaging, web, social media, co-browsing, and the like. In this regard, the multimedia/social media server 154 may take the form of any IP router conventional in the art with specialized hardware and software for receiving, processing, and forwarding multi-media events.

The web servers 120 may include, for example, social interaction site hosts for a variety of known social interaction sites to which an end user may subscribe, such as, for example, Facebook, Twitter, and the like. In this regard, although in the embodiment of FIG. 1 the web servers 120 are depicted as being part of the contact center system, the web servers may also be provided by third parties and/or maintained outside of the contact center premise. The web servers may also provide web pages for the enterprise that is being supported by the contact center. End users may browse the web pages and get information about the enterprise's products and services. The web pages may also provide a mechanism for contacting the contact center, via, for example, web chat, voice call, email, web real time communication (WebRTC), or the like.

According to one exemplary embodiment of the invention, in addition to real-time interactions, deferrable (also referred to as back-office or offline) interactions/activities may also be routed to the contact center agents. Such deferrable activities may include, for example, responding to emails, responding to letters, attending training seminars, or any other activity that does not entail real time communication with a customer. In this regard, an interaction (iXn) server 156 interacts with the routing server 124 for selecting an appropriate agent to handle the activity. Once assigned to an agent, an activity may be pushed to the agent, or may appear in the agent's workbin 136a-136c (collectively referenced as 136) as a task to be completed by the agent. The agent's workbin may be implemented via any data structure conventional in the art, such as, for example, a linked list, array, and/or the like. The workbin 136 may be maintained, for example, in buffer memory of each agent device 130.

According to one exemplary embodiment of the invention, the mass storage device(s) 126 may store one or more databases relating to agent data (e.g. agent profiles, schedules, etc.), customer data (e.g. customer profiles), interaction data (e.g. details of each interaction with a customer, including reason for the interaction, disposition data, time on hold, handle time, etc.), and the like. According to one embodiment, some of the data (e.g. customer profile data) may be maintained in a customer relations management (CRM) database hosted in the mass storage device 126 or elsewhere. The mass storage device may take form of a hard disk or disk array as is conventional in the art.

According to some embodiments, the contact center system may include a universal contact server (UCS) 127, configured to retrieve information stored in the CRM database and direct information to be stored in the CRM database. The UCS 127 may also be configured to facilitate maintaining a history of customers' preferences and interaction history, and to capture and store data regarding comments from agents, customer communication history, and the like.

The contact center system may also include a reporting server 134 configured to generate reports from data aggregated by the statistics server 132. Such reports may include near real-time reports or historical reports concerning the state of resources, such as, for example, average waiting time, abandonment rate, agent occupancy, and the like. The reports may be generated automatically or in response to specific requests from a requestor (e.g. agent/administrator, contact center application, and/or the like).

The contact center system may also include a call recording server 158 configured to record interactions, including voice calls, text chats, emails, and the like. The recorded interactions may be stored in the mass storage device 126, in addition to other types of data. In some embodiments, the mass storage device includes multiple storage devices (e.g., multiple hard drives or solid state drives). In some embodiments of the present invention, the mass storage device 126 is abstracted as a data storage service, which may be a cloud based service such as Amazon Simple Storage Service (S3) or Google Cloud Storage.

The contact center system may also include a workforce management server 160, which is configured to manage the agents of a contact center, including setting the work schedules of the agents of the contact center in accordance with predicted demand (e.g., predicted numbers of incoming and outgoing interactions with the contact center across the different media types), in accordance with agent vacation plans, break times, and the like. The schedules generated by the workforce management server may also account for time spent by agents and supervisors in meetings, group or individual training sessions, coaching sessions, and the like. Taking into account the various demands on an agent's time and a supervisor's time during the work day can be used to ensure that there are sufficient agents available to handle the interactions workload.

The contact center system may further include a quality management server 170 configured to provide quality monitoring of agents of the contact center. The quality management server 162 may provide a user interface for human supervisors to evaluate agents, such as by reviewing one or more recorded interactions associated with an agent (or providing real-time review of an agent while the agent is participating in the interaction), an automatic evaluation module for automatically analyzing an interaction, and an action module for generating actions in response to computing particular scores associated with an interaction or interactions, where the actions may include deleting the associated interaction (e.g., removing it from the mass storage device 126), setting an expiration date for the recording (e.g., a date on which the recording should be deleted), marking the recording to be preserved, and forwarding the interaction for quality review by a human supervisor. Functions and methods performed by the quality management server 170 will be described in more detail below.

The various servers of FIG. 1 may each include one or more processors executing computer program instructions and interacting with other system components for performing the various functionalities described herein. The computer program instructions are stored in a memory implemented using a standard memory device, such as, for example, a random access memory (RAM). The computer program instructions may also be stored in other non-transitory computer readable media such as, for example, a CD-ROM, flash drive, or the like. Also, although the functionality of each of the servers is described as being provided by the particular server, a person of skill in the art should recognize that the functionality of various servers may be combined or integrated into a single server, or the functionality of a particular server may be distributed across one or more other servers without departing from the scope of the embodiments of the present invention.

In the various embodiments, the terms "interaction" and "communication" are used interchangeably, and generally refer to any real-time and non-real time interaction that uses any communication channel including, without limitation telephony calls (PSTN or VoIP calls), emails, vmails (voice mail through email), video, chat, screen-sharing, text messages, social media messages, web real-time communication (e.g. WebRTC calls), and the like.

Quality Management

Aspects of embodiments of the present invention are directed to systems and methods for automating portions of a quality monitoring process in a contact center. The quality monitoring process may be used to monitor and to evaluate the quality of contact center agents' interactions with customers. The automatic analysis or automatic evaluation may be performed on metadata associated with the interaction (such as the length of the interaction in minutes and the number of transfers between different agents of the contact center) as well as the content of the interaction (e.g., an analysis of the text transcripts of the interaction to detect keywords or phrases), and the automatic evaluation of the interaction may be used to generate one or more evaluation scores representing the agent's performance during the interaction.

The automatic evaluations may be used to perform, automatically, various actions. For example, automation in accordance with embodiments of the present invention allows a faster response to changes in the quality of agent performance, such as automatically assigning an interaction for further human supervisor review shortly after the completion of the interaction (e.g., as soon as the interaction is over), and culling uninteresting interactions from a database when they are determined to be unnecessary or cumulative. The automation may also allow the human supervisors to focus on problematic interactions, rather than having the human supervisors review a random sampling of interactions, many of which may have ratings that are within expected performance levels, and therefore would be merely cumulative of the data already possessed by the supervisors.

Embodiments of the present invention also improve the efficiency of the hardware supporting a contact center, such as by reducing the number of interactions that are stored in the mass storage device 126 by discarding or deleting uninteresting interactions, as determined through the automatic analysis of the interactions, and thereby making more efficient use of data storage space within the contact center systems.

Furthermore, aspects of embodiments of the present invention are directed to the automatic assignment of agent training or coaching sessions to agents based on one or more automatically computed evaluation scores of the agent's performance, thereby allowing for faster feedback and more rapid correction of agent behavior.

Automatic Analysis of Calls

Figure 2:
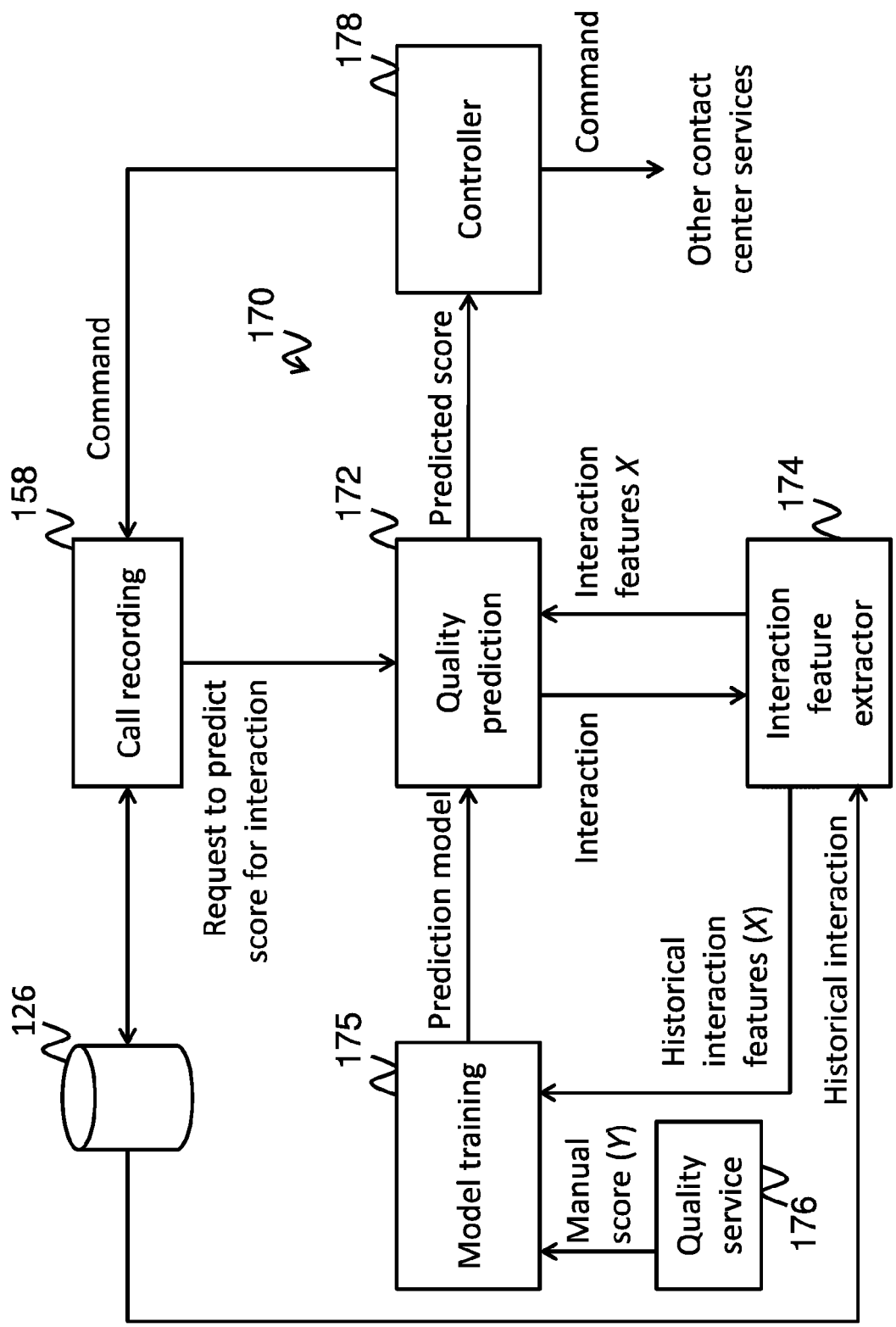
FIG. 2 is an architectural block diagram of a quality prediction system according to one embodiment of the present invention.

FIG. 2 is an architectural block diagram of a quality prediction system according to one embodiment of the present invention.

Referring to FIG. 2, the quality management server 170 may include a quality prediction module 172 and an interaction feature extractor 174. In the embodiment shown, the quality prediction module 172 may receive requests to predict an evaluation score for a recorded interaction. The request may come from the call recording server 158, which may also provide the recorded interaction to be evaluated from the mass storage device 126. The quality management server 170 may also include a quality service 176, which is configured to provide a user interface (e.g., a web server providing a web application) for human supervisors to perform evaluations of interactions and to score the interactions based on evaluation criteria. These manually generated evaluation scores may also be provided to the quality prediction module 172 in order to train quality prediction models.

Aspects of embodiments of the present invention are directed to a quality prediction module 172 that is configured to automatically evaluate an interaction and to generate an evaluation (e.g., one or more scores) of the interaction. The one or more scores of the evaluation may predict one or more scores that would be assigned to the interaction if the interaction were manually evaluated by a human supervisor. However, as described in more detail below, the quality prediction module 172 applies different techniques to arrive at the one or more scores than would be used by a human supervisor.

In various embodiments of the present invention, the interaction includes at least two components: the content of the interaction and the metadata of the interaction.

The content of the interaction includes the verbal messages exchanged between the participants. For example, in the case of an audio and/or video conversation conducted over the telephone or a videoconferencing session, the verbal message may include the oral spoken communications (or "the speech") of the agent and the customer. In the case of a text chat, the content may include the actual messages typed and sent by the agent and the customer. In the case of an email conversation, the content may include user-modifiable fields such as the body of the email and, in some instances, the subject line of the email.

The metadata of the interaction includes portions of the interaction that are not readily user-modifiable. These may include, for example, identifiers of the agent and customer involved in the interaction (e.g., phone numbers, email addresses, assigned customer numbers or agent numbers, etc.), timestamps of various messages, the number of messages sent in the interaction (e.g., the number of messages sent in a text chat or the number of email messages exchanged), the length (e.g., in minutes) of an audio and/or video interaction, customer feedback regarding the interaction (e.g., net promoter score), and the like.

Figure 3:
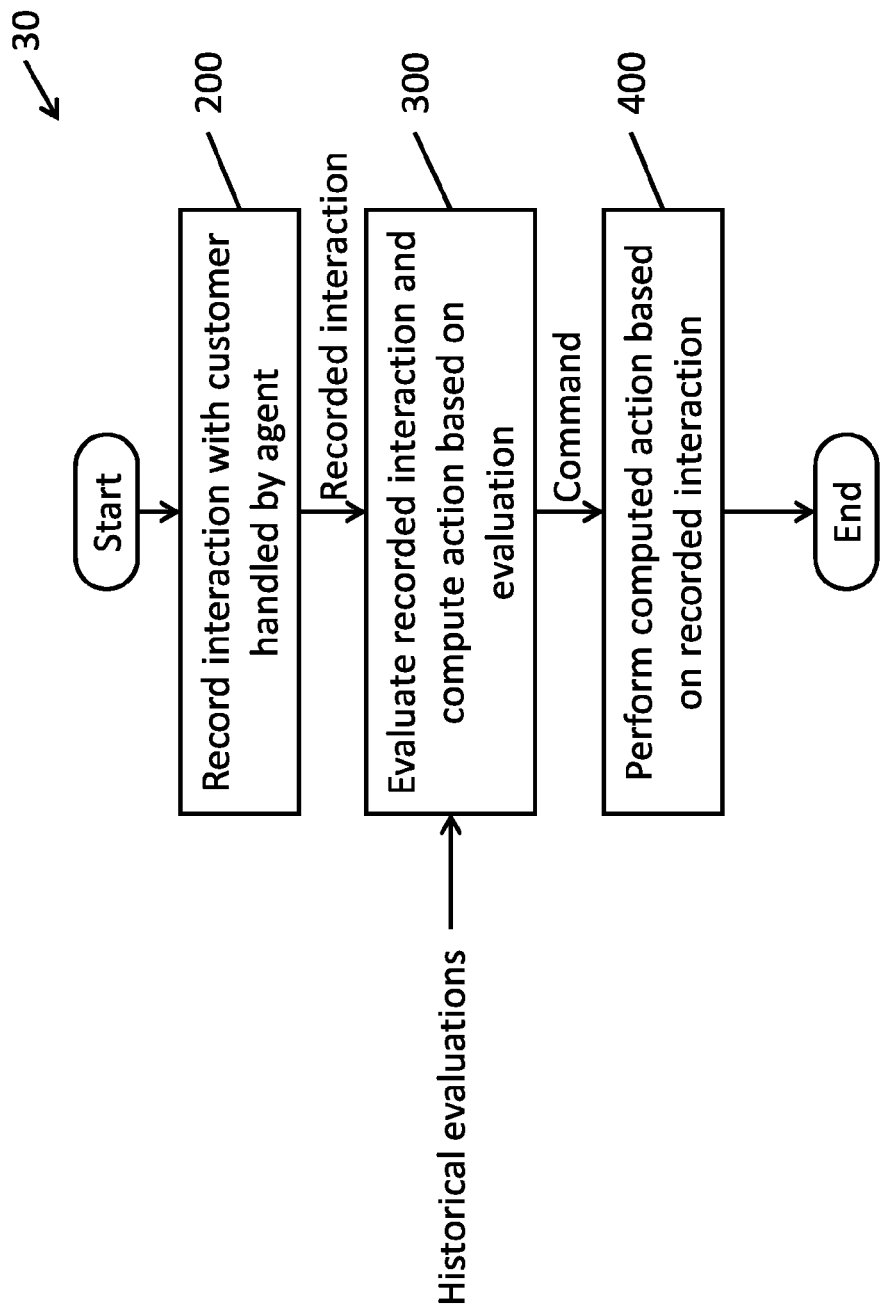
FIG. 3 is a flowchart illustrating a method, according to one embodiment of the present invention, for automatically performing an action based on the automatic analysis of a recorded interaction at a contact center.

FIG. 3 is a flowchart illustrating a method, according to one embodiment of the present invention, for automatically performing an action based on the automatic analysis of a recorded interaction at a contact center. Referring to FIG. 3, the method 30 includes, in operation 200, recording (e.g., by the call recording server 158) an interaction with a customer as handled by an agent. As noted above, this may be a recording of an audio or video interaction, a chat session, an email exchange, or the like. The call recording server 158 may store the recorded interaction in the mass storage device 126. In operation 300, the quality management server 170 automatically evaluates the recorded interaction and computes an action to be taken, if any, based on the evaluation (e.g., based on the one or more scores included in the evaluation). In operation 400, the action computed by the quality module is performed by the appropriate component of the contact center. For example, operation 400 may be implemented by transmitting a command from the quality management server 170 to another server or module of the contact center in order to control the contact center to perform the action, such as deleting the interaction from the mass storage device, setting an expiry date on the interaction, assigning training to the agent, and the like.

Figure 4:
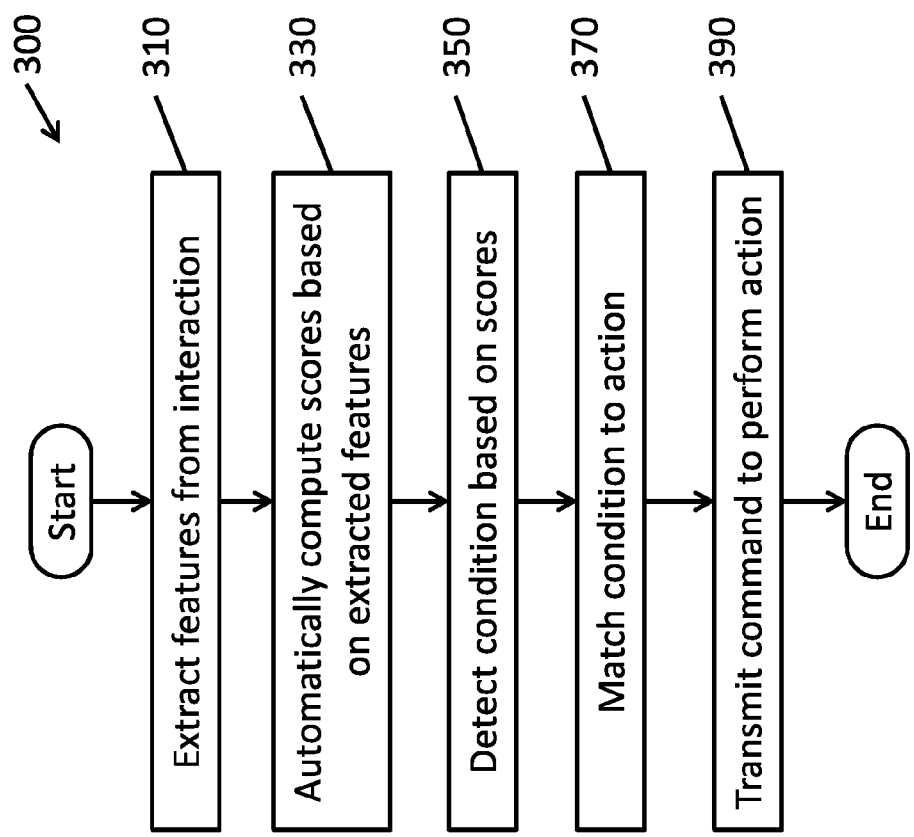
FIG. 4 is a flowchart illustrating a method for automatically evaluating a recorded interaction and computing an action to be taken, according to one embodiment of the present invention.

FIG. 4 is a flowchart illustrating a method for automatically evaluating a recorded interaction and computing an action to be taken, according to one embodiment of the present invention. Referring to FIG. 4, in operation 310, the quality prediction module 172 of the quality management server 170 supplies the received recorded interaction to the interaction feature extractor 174 to extract features from the interaction.

The interaction feature extractor 174 may extract different features from the interaction depending on the type of recorded interaction being processed. For example, audio and voice interaction may have different features from text chat interactions, which may also have different features from email interactions. The features may be extracted from both the content and the metadata of the interactions, as described in more detail below.

According to some embodiments of the present invention, features may be extracted from the content of the interactions by detecting various conditions within the interactions. For the sake of convenience, some aspects of the below discussion assume that a text transcript of an interaction is available. In the case of a text chat (e.g., web browser based chat, instant messaging, cellular text messaging, Internet Relay Chat, and the like) and in the case of an email interaction, the text transcript may be extracted from the actual messages. In the case of audio and/or video interactions, text transcripts of these interactions may be generated by supplying the interaction to an automatic speech recognition (ASR) engine such as a large-vocabulary continuous speech recognition (LVCSR) engine in order to generate a text transcript.

According to some embodiments of the present invention, some of the interaction features are computed based on keyword spotting or keyword detection. One example of a system and method for keyword spotting based on phonemes is described in U.S. Pat. No. 9,672,815, issued on Jun. 6, 2017, the entire disclosure of which is incorporated by reference herein. In some embodiments, keyword spotting is performed by searching for instances of the keywords within the text transcripts.

For example, in order to measure agent compliance with a script for responding to customer inquiries, keyword spotting may be used to detect whether the agent used (e.g., spoken or typed) particular keywords at particular times in the interaction. These keywords may include detecting whether the agent greeted the customer (e.g., "hello", "help"), thanked the customer for being a customer (e.g., "thanks"), attempted to develop rapport with the customer (e.g., "Colts", "Nationals"), took ownership of a problem ("solve", "problem), and the like.

Keyword detection may also be used to detect features that indicate agent misbehavior. For example, the use of profanity by the agent or rude or otherwise inappropriate language by the agent may be detected by a keyword detection method.

In some embodiments of the present invention, the keyword features are encoded using one-hot encoding, where each feature corresponds to the presence or absence of a particular keyword.

In some embodiments of the present invention, the interaction features include sentiment analysis to provide information about the customer's emotions as well as the agent's emotions. For example, sentiment analysis may be used to detect whether the customer ended the interaction in a way that expressed pleasure (e.g., that a problem was resolved) or anger (e.g., that the problem could not be solved). Similarly, sentiment detection may be used to detect whether the agent's portion of the conversation was pleasant and confident or angry and defensive.

In some embodiments of the present invention concept clustering may be used to detect the presence of particular concepts or topics within an interaction. Word-to-vector transformations (frequently referred to as "word2vec") relate to a group of related models that are used to produce word embeddings. In particular, word2vec transformations transform text words into numerical vector representations, where words having similar meanings (semantically similar words) are transformed into similar vectors. Clustering words that are frequently found in the context of a particular contact center (e.g., for a particular enterprise) using, for example, k-means clustering, can be used to specify frequent "topics" or "concepts" that are discussed in interactions. These clusters may be generated in advance, based on an analysis of historical recorded interactions at the contact center.

In some embodiments, the feature extractor 174 performs expectation maximization clustering on the words that were transformed into vectors and uses the cluster outcomes as features (e.g., tagging with particular "topics"). In some embodiments, the word2vec is applied to n-grams (e.g., sequences of at least two words) may also be used instead of single words, in order to capture phrases (e.g., "thank you for being a customer").

By performing word2vec transformations of the words within the content of a particular interaction and determining which of the pre-generated clusters those words are closest to, the feature extractor 174 computes one or more features that identify the topics or concepts that were discussed in the interaction, even if the particular words that mapped to the cluster did not appear in the historical interactions that were used to pre-generate the clusters.

In some embodiments of the present invention, the feature extractor 174 performs linear discriminant analysis (LDA) or principal component analysis (PCA) on the vectors representing the words and the outcomes of the LDA or PCA are used as the features.

Furthermore term frequency-inverse document frequency (TF-IDF) may be applied to the words in order to give higher weight to words or phrases that are more salient. For example, many interactions may include all of the words in a standard script, and therefore these words or phrases might not be useful as features because they appear in almost every interaction. Instead, words or phrases that appear less frequently may provide more information about the content of an interaction. TF-IDF analysis provides a metric of the saliency of a word or phrase, and therefore may be used in combination with the above word2vec vectors in order to, for example, increase the weights of more salient words when generating features identifying topics or concepts detected within the interactions.

Some aspects of embodiments of the present invention are directed to automatically extracting interaction features based on the metadata about the interaction. Some of these metadata may include the number of transfers of the interaction between agents, customer feedback (e.g., a net promoter score (NPS) or survey data), the time of day of the interaction, and conversation length (e.g., the number of chat messages sent, the number of emails sent, the total amount of text sent between the customer and agent, the duration of the text chat session or the audio or video conference).

In some embodiments, the interaction feature extractor 174 represents qualitative features using one-hot encoding (e.g., the presence or absence of a particular feature, such as whether or not an interaction was transferred). In some embodiments, quantitative data is encoded with quantile discretization (e.g., binning numerical data into groups). For example, interactions that were less than 5 minutes long may be put into one bin, interactions that were 5 to 15 minutes long may be put into another bin, and interactions that were over 15 minutes long may be put into a third bin, and the features relating to the length of the interaction may merely indicate which bin the interaction fell into.

In one embodiment of the present invention, the interaction features X may include a total of n features be expressed as a collection of features, such as a feature vector ($X_1, X_2, \ldots, X_n$).

The interaction features X extracted by the feature extractor 174 are returned to the quality predictor 172, which uses the extracted interaction features to automatically compute scores for the interaction in operation 330. The scores may be calculated by supplying the features to one or more prediction models that may be trained to predict the scores that a human supervisor would assign to the interaction.

According to one embodiment of the present invention, the one or more prediction models are trained by a model training module 175 based on historical recorded interactions and the scores Y assigned to those interactions by human supervisors.

When reviewing an interaction, a human supervisor may complete an evaluation form that includes one or more questions. Each of the questions may ask the human supervisor to provide, for example, a numerical rating of the agent's performance (e.g., "rate the agent's professionalism on a scale of 1 to 10") or to provide a yes or no answer to a question (e.g., "did the agent use profanity?"), and these scores may be stored in a quality service 176.

When generating training data for training the prediction module, the manually generated score or scores for a given interaction is retrieved from the quality service 176, and the corresponding historical interaction is retrieved from the mass storage device 126 and supplied to the interaction feature extractor 174 to extract the features for the historical interaction. The combinations of historical interaction features and their associated evaluations represent individual data points of a set of training data. For example, where the evaluation may include multiple scores (e.g., m scores), then the set of scores may be represented as the vector ($Y_1, Y_2, \ldots, Y_m$), and the combination of the feature vector of a historical interaction (the historical interaction features) and its associated scores may be represented as $\{(X_1, X_2, \ldots, X_n), (Y_1, Y_2, \ldots, Y_m)\}$.

The training data may then be used to train, validate, and test the one or more prediction models. Each prediction model may be used to predict an answer or a score for a corresponding one of the questions of the evaluation form (e.g., for a particular score $Y_i$ of the evaluation form). In various embodiments of the present invention, each the prediction models may be a model such as a linear regression model, a multiple regression model, a k-nearest neighbors regression, a random forest tree, a support vector machine, or a neural network, which may be selected based on applicability to the particular portion of the evaluation to be predicted and the characteristics of the interaction features supplied to the prediction model. The particular choice of learning algorithm may depend on the organization and the type of data collected from the interactions, such as which features have a greater influence on the human computed evaluation scores, as set by business policies of the organization.

For example, often, when using text attributes or features derived from the text of the transcription of the interaction, the features may not be linearly separable. In such circumstances, in one embodiment of the present invention, the prediction model is a random forest tree with regression, which may perform well in circumstances of complex (e.g., linearly inseparable) relationships between the interaction features.

In some embodiments, principal component analysis (PCA) or other feature selection methods may also be used to reduce dimensionality of the data in cases where the prediction model is a k-nearest neighbors (KNN) regression model.

One example of correlations between the interaction features and evaluation scores that may be captured by the prediction models, relates to the automatic detection of script compliance through keyword detection. The presence of keywords corresponding to words or phrases contained in the script may indicate script compliance, whereas the failure to detect such keywords may indicate noncompliance with the script.

Similarly, the detection of profanity within the interaction may result in a low score on an agent professionalism evaluation question for the recorded interaction.

A long conversation and negative customer sentiment may also be correlated with a low score, as it may be correlated with a low NPS if the agent is unable to solve the customer's problem, but a long conversation and positive customer sentiment may be correlated with a high score, as it may show that the agent was able to develop rapport with the customer.

Detecting the Satisfaction of Threshold Conditions and Taking Actions

In operation 350, the controller 178 receives the predicted score or scores from the quality prediction module 172 and determines whether one or more conditions has been met or satisfied for triggering an action.

In some embodiments of the present invention, the automatic evaluation of a single recorded interaction (e.g., the automatically computed scores in the evaluation of the recorded interaction) is compared against various threshold conditions to determine if a condition is met.

In other embodiments of the present invention, the automatically computed evaluations from multiple interactions are compared as an aggregate against threshold conditions. For example, a time window may be specified where all automatically computed evaluations of interactions involving a particular agent falling within a time window are aggregated, and the aggregated scores for the agent during the time window are compared against the various threshold conditions. In still other embodiments of the present invention, all of the automatically computed interactions for a particular agent are aggregated and compared against various time windows.

In operation 370, the controller matches the detected conditions with corresponding actions to take based on those conditions.

In operation 390, the controller transmits one or more commands to perform the actions in response to the detection of those conditions, and, referring to FIG. 3, in operation 400 the component of the contact center receiving the command performs the requested action.

Specific examples of conditions that may be set and detected in operation 350 and their respective actions that may be matched in operation 370 will be described below.

Examples of Conditions and Actions Taken in Response to Detecting the Satisfaction the Threshold Conditions by Automatically Computed Evaluations Some aspects of embodiments of the present invention are directed to taking particular actions on interactions in response to predicting scores for those interactions, where those predicted scores satisfy various thresholds.

According to one embodiment of the present invention, the controller 178 is configured to generate one or more alerts when a score of an interaction is below a threshold level. For example, in an environment in which a typical score of an interaction is 60 out of 100, a condition may be set to generate an alert when a predicted score of an interaction is below 30, thereby indicating that an egregiously low quality interaction may have occurred. The alert may be displayed as a pop-up notification on a device associated with the agent's supervisor (e.g., a pop-up in a web browser interface that the supervisor is signed in to, a message in an instant messaging system, a text message to the supervisor's mobile phone, a notification generated by an application installed on the supervisor's mobile phone, and the like). This alert may be used to prompt the supervisor to investigate the low-quality interaction. For example, the supervisor may contact the agent or may manually review the recorded interaction to understand what happened. The manager may also act to stop the agent from handling further interactions or to contact the customer involved in the interaction to repair the relationship.

One aspect of embodiments of the present invention relates to assigning interactions to one or more human supervisors for manual review. As noted above, some interactions may be more "interesting" in that they contain agent behavior that does not comply with standards or that they contain extraordinarily good agent behavior. As discussed above, the automatic scoring of an interaction may provide an indication as to whether a particular interaction is interesting or not. For example, the controller may tag an interaction as being "interesting" if one or more scores of the interaction is significantly outside the typical range of scores in the environment (e.g., more than two standard deviations from the mean score). For example, a particularly low score on an interaction may be an indication of flagging performance by an agent, or may indicate unusual, difficult interaction for the agent to handle (e.g., a particularly belligerent and/or irrational customer).

In some embodiments of the present invention, multiple recorded interactions may be assigned to a human supervisor for review (or manual evaluation) when a condition detected during the automatic analysis of the interaction is met. For example, the condition may include the scores of all interactions that the agent participated in within a particular time window (e.g., from 3 pm to 4 pm on the previous business day), and the condition may trigger a review of all of the interactions if any one of those interactions contained an instance of the agent's use of profanity. In another embodiment, all interactions that were automatically evaluated and given a predicted score less than a threshold value are automatically assigned to a human supervisor for manual review.

In one embodiment of the present invention, to assign a recorded interaction to a human supervisor for review, the controller 178 may transmit a command to the quality management server 170 to assign a task to the human supervisor. The task may be, for example, assigned as a "to do" item in the supervisor's workbin, sent as an email in the human supervisor's email inbox, or added as a task in a project management system.

In the context of managing recordings of interactions, a system administrator may also set rules or policies that establish conditions for retaining the interaction, deleting the interaction, archiving the interaction, and the like. In some embodiments, retained interactions may be provided with an expiration date (such as two weeks from the date of recording), and after expiration, the retained interaction is deleted. For example, "interesting" interactions, as described above, may be automatically preserved (set with longer expiration dates) so that they can be reviewed later on by a human supervisor, while uninteresting interactions (e.g., those falling within a threshold range for compliance with agent performance standards, such as being within one standard deviation of the mean score or being within two standard deviations of the mean score) may be given shorter expiration dates or deleted immediately.

Some aspects of embodiments of the present invention relate to recalibration of human supervisor evaluations. For example, if most human supervisors assign scores within a particular distribution that is consistent with the predicted scores computed by the quality prediction module 172, but some human supervisors assign scores having a distribution that is different or inconsistent from the distribution of scores computed by the quality prediction module 172 (e.g., those human supervisors consistently give higher or lower scores than the predicted scores), then those inconsistent human supervisors may be identified for recalibration training to align their evaluation standards to the standards applied by the other supervisors.

Automatic Scheduling of Training Based on Automatic Evaluations

Another aspect of embodiments of the present invention relates to scheduling, automatically, additional training sessions for agents for which the system has automatically detected problems or other procedural noncompliance in the agent's interactions. As noted above, the automatically extracted features and the prediction models may be used to detect and score agent behavior during the interaction along a variety of different evaluation parameters (e.g., professionalism, script compliance, knowledge of particular products, and the like). As such, targeted training sessions may be assigned to the agent to correct the detected problems.

As a more specific example, a threshold condition detected in operation 350 may be a percentage of "bad" interactions over a time period, where a "bad" interaction corresponds to a particular score being below an individual interaction threshold level. For example, if an acceptable score in one portion of an evaluation is 6 out of 10 and if the quality predictor module 172 predicts a score of 5 out of 10 on that portion of the evaluation, then the interact may be marked as "bad". As another example, an interaction may be bad if an aggregate of the scores (e.g., a sum or weighted sum of the individual scores) is below a threshold. For example, if the highest possible aggregated score is 100, then an interaction may be marked as a "bad" interaction if the aggregated score is less than 65.

In some embodiments, the scoring thresholds for "bad performance" are set by a human supervisor or administrator in accordance with business requirements. These scoring thresholds may be calculated based on individual evaluations/scores or trends over time or number/percentage of "bad" evaluations over a time window. For example, a threshold condition of less than 30% of interactions meeting par would be triggered if 8 of 12 interactions were poor.

As another example, in some embodiments, the condition is a z-score threshold or standard score. In particular, the controller may calculate the Gaussian distribution across all agents' prediction scores in the contact center over a specific time range, and if a particular agent's average z-score (which may be a running score over time) is below a threshold, then a condition is met for assigning training to the agent.

In still another embodiment of the present invention, the condition may be based on using a particular agent's past performance predict an agent's current performance. The controller may then compare the predicted performance with the automatically evaluated performance on a recent interaction with to detect deviations in the agent's performance from history, which may show signs of worsening performance (and resulting in the automatic scheduling of additional training) or improving performance (where the agent may be sent a message congratulating him or her on the improvement and encouraging continued progress).

As noted above, the particular training that is automatically scheduled for the agent may be selected based on particular aspects of score. For example, poor performance on a script compliance component of the score may result in specific training on using the agent tools for following the assigned script. Similarly, poor performance on upselling customers on products may result in assigning specific training on how to deliver an upsell message. A low score on agent professionalism may result in assigning specific training on avoiding profanity and maintaining a calm demeanor. A low score on knowledge of a particular line of products may result in assigning specific training about the particular line of products.

As such, aspects of embodiments of the present invention are directed to systems and methods for automatically monitoring the quality of an agent's performance and automatically assigning training to the agent based on meeting particular conditions, such as automatically computed scores failing to meet minimum standards.

Multiple Tenants

In some embodiments of the present invention, the same underlying quality prediction 172 and feature extraction 174 modules may be used by different tenants in a multi-tenant environment, where individual requests for extracting features or performing predictions may be associated with particular identifiers (e.g., identifiers of particular contact centers and/or enterprises), where the identifiers are used to select the particular prediction models trained for the corresponding tenant.

Computing Devices

As described herein, various applications and aspects of the present invention may be implemented in software, firmware, hardware, and combinations thereof. When implemented in software, the software may operate on a general purpose computing device such as a server, a desktop computer, a tablet computer, a smartphone, or a personal digital assistant. Such a general purpose computer includes a general purpose processor and memory.

Each of the various servers, controllers, switches, gateways, engines, and/or modules (collectively referred to as servers) in the afore-described figures may be a process or thread, running on one or more processors, in one or more computing devices 1500 (e.g., FIG. 5A, FIG. 5B), executing computer program instructions and interacting with other system components for performing the various functionalities described herein. The computer program instructions are stored in a memory which may be implemented in a computing device using a standard memory device, such as, for example, a random access memory (RAM). The computer program instructions may also be stored in other non-transitory computer readable media such as, for example, a CD-ROM, flash drive, or the like. Also, a person of skill in the art should recognize that a computing device may be implemented via firmware (e.g. an application-specific integrated circuit), hardware, or a combination of software, firmware, and hardware. A person of skill in the art should also recognize that the functionality of various computing devices may be combined or integrated into a single computing device, or the functionality of a particular computing device may be distributed across one or more other computing devices without departing from the scope of the exemplary embodiments of the present invention. A server may be a software module, which may also simply be referred to as a module. The set of modules in the contact center may include servers, and other modules.

The various servers may be located on a computing device on-site at the same physical location as the agents of the contact center or may be located off-site (or in the cloud) in a geographically different location, e.g., in a remote data center, connected to the contact center via a network such as the Internet. In addition, some of the servers may be located in a computing device on-site at the contact center while others may be located in a computing device off-site, or servers providing redundant functionality may be provided both via on-site and off-site computing devices to provide greater fault tolerance. In some embodiments of the present invention, functionality provided by servers located on computing devices off-site may be accessed and provided over a virtual private network (VPN) as if such servers were on-site, or the functionality may be provided using a software as a service (SaaS) to provide functionality over the internet using various protocols, such as by exchanging data using encoded in extensible markup language (XML) or JavaScript Object notation (JSON).

Figure 5A:
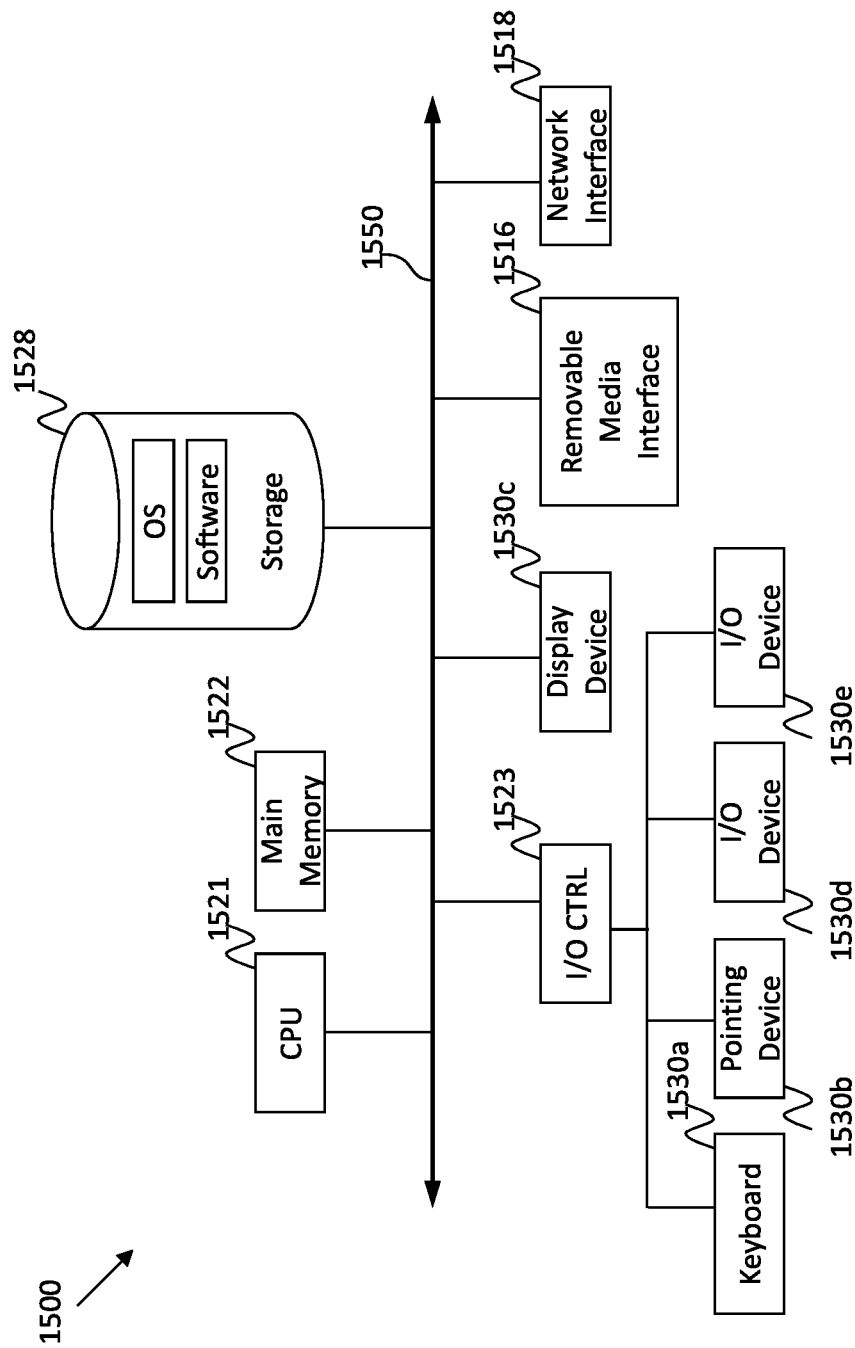
FIG. 5A is a block diagram of a computing device according to an embodiment of the present invention.
Figure 5B:
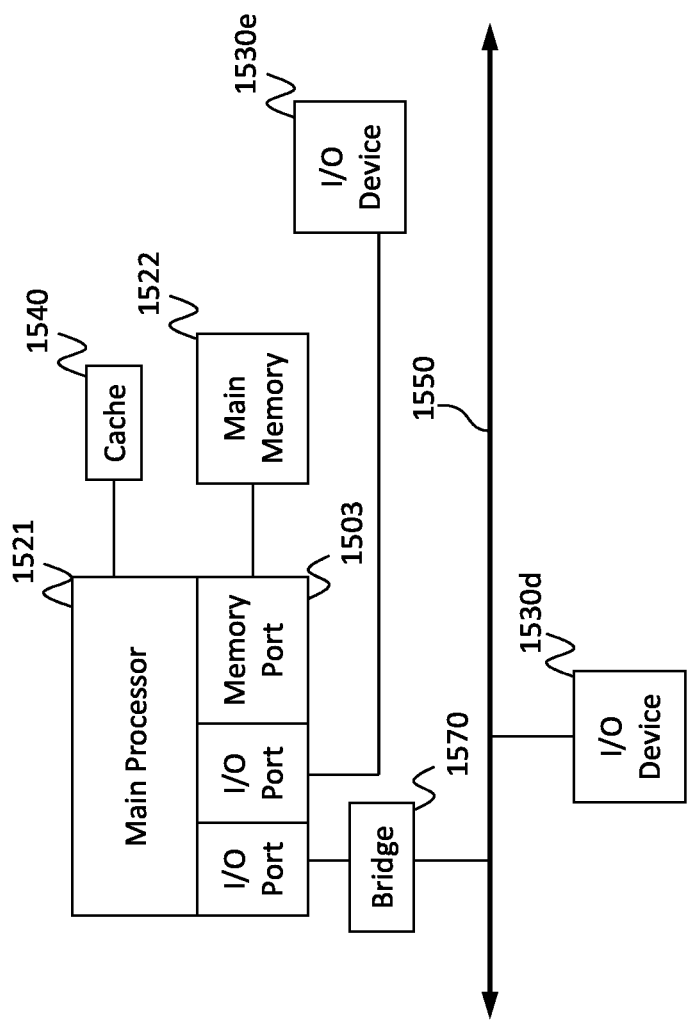
FIG. 5B is a block diagram of a computing device according to an embodiment of the present invention.

FIG. 5A-FIG. 5B depict block diagrams of a computing device 1500 as may be employed in exemplary embodiments of the present invention. Each computing device 1500 includes a central processing unit 1521 and a main memory unit 1522. As shown in FIG. 5A, the computing device 1500 may also include a storage device 1528, a removable media interface 1516, a network interface 1518, an input/output (I/O) controller 1523, one or more display devices 1530c, a keyboard 1530a and a pointing device 1530b, such as a mouse. The storage device 1528 may include, without limitation, storage for an operating system and software. As shown in FIG. 5B, each computing device 1500 may also include additional optional elements, such as a memory port 1503, a bridge 1570, one or more additional input/output devices 1530d, 1530e and a cache memory 1540 in communication with the central processing unit 1521. The input/output devices 1530a, 1530b, 1530d, and 1530e may collectively be referred to herein using reference numeral 1530.

The central processing unit 1521 is any logic circuitry that responds to and processes instructions fetched from the main memory unit 1522. It may be implemented, for example, in an integrated circuit, in the form of a microprocessor, microcontroller, or graphics processing unit (GPU), or in a field-programmable gate array (FPGA) or application-specific integrated circuit (ASIC). The main memory unit 1522 may be one or more memory chips capable of storing data and allowing any storage location to be directly accessed by the central processing unit 1521. As shown in FIG. 5A, the central processing unit 1521 communicates with the main memory 1522 via a system bus 1550. As shown in FIG. 5B, the central processing unit 1521 may also communicate directly with the main memory 1522 via a memory port 1503.

FIG. 5B depicts an embodiment in which the central processing unit 1521 communicates directly with cache memory 1540 via a secondary bus, sometimes referred to as a backside bus. In other embodiments, the central processing unit 1521 communicates with the cache memory 1540 using the system bus 1550. The cache memory 1540 typically has a faster response time than main memory 1522. As shown in FIG. 5A, the central processing unit 1521 communicates with various I/O devices 1530 via the local system bus 1550. Various buses may be used as the local system bus 1550, including a Video Electronics Standards Association (VESA) Local bus (VLB), an Industry Standard Architecture (ISA) bus, an Extended Industry Standard Architecture (EISA) bus, a MicroChannel Architecture (MCA) bus, a Peripheral Component Interconnect (PCI) bus, a PCI Extended (PCI-X) bus, a PCI-Express bus, or a NuBus. For embodiments in which an I/O device is a display device 1530c, the central processing unit 1521 may communicate with the display device 1530c through an Advanced Graphics Port (AGP). FIG. 5B depicts an embodiment of a computer 1500 in which the central processing unit 1521 communicates directly with I/O device 1530e. FIG. 5B also depicts an embodiment in which local busses and direct communication are mixed: the central processing unit 1521 communicates with I/O device 1530d using a local system bus 1550 while communicating with I/O device 1530e directly.

A wide variety of I/O devices 1530 may be present in the computing device 1500. Input devices include one or more keyboards 1530a, mice, trackpads, trackballs, microphones, and drawing tablets. Output devices include video display devices 1530c, speakers, and printers. An I/O controller 1523, as shown in FIG. 5A, may control the I/O devices. The I/O controller may control one or more I/O devices such as a keyboard 1530a and a pointing device 1530b, e.g., a mouse or optical pen.

Referring again to FIG. 5A, the computing device 1500 may support one or more removable media interfaces 1516, such as a floppy disk drive, a CD-ROM drive, a DVD-ROM drive, tape drives of various formats, a USB port, a Secure Digital or COMPACT FLASH™ memory card port, or any other device suitable for reading data from read-only media, or for reading data from, or writing data to, read-write media. An I/O device 1530 may be a bridge between the system bus 1550 and a removable media interface 1516.

The removable media interface 1516 may for example be used for installing software and programs. The computing device 1500 may further include a storage device 1528, such as one or more hard disk drives or hard disk drive arrays, for storing an operating system and other related software, and for storing application software programs. Optionally, a removable media interface 1516 may also be used as the storage device. For example, the operating system and the software may be run from a bootable medium, for example, a bootable CD.

In some embodiments, the computing device 1500 may include or be connected to multiple display devices 1530c, which each may be of the same or different type and/or form. As such, any of the I/O devices 1530 and/or the I/O controller 1523 may include any type and/or form of suitable hardware, software, or combination of hardware and software to support, enable or provide for the connection to, and use of, multiple display devices 1530c by the computing device 1500. For example, the computing device 1500 may include any type and/or form of video adapter, video card, driver, and/or library to interface, communicate, connect, or otherwise use the display devices 1530c. In one embodiment, a video adapter may include multiple connectors to interface to multiple display devices 1530c. In other embodiments, the computing device 1500 may include multiple video adapters, with each video adapter connected to one or more of the display devices 1530c. In some embodiments, any portion of the operating system of the computing device 1500 may be configured for using multiple display devices 1530c. In other embodiments, one or more of the display devices 1530c may be provided by one or more other computing devices, connected, for example, to the computing device 1500 via a network. These embodiments may include any type of software designed and constructed to use the display device of another computing device as a second display device 1530c for the computing device 1500. One of ordinary skill in the art will recognize and appreciate the various ways and embodiments that a computing device 1500 may be configured to have multiple display devices 1530c.

A computing device 1500 of the sort depicted in FIG. 5A-FIG. 5B may operate under the control of an operating system, which controls scheduling of tasks and access to system resources. The computing device 1500 may be running any operating system, any embedded operating system, any real-time operating system, any open source operating system, any proprietary operating system, any operating systems for mobile computing devices, or any other operating system capable of running on the computing device and performing the operations described herein.

The computing device 1500 may be any workstation, desktop computer, laptop or notebook computer, server machine, handheld computer, mobile telephone or other portable telecommunication device, media playing device, gaming system, mobile computing device, or any other type and/or form of computing, telecommunications or media device that is capable of communication and that has sufficient processor power and memory capacity to perform the operations described herein. In some embodiments, the computing device 1500 may have different processors, operating systems, and input devices consistent with the device.

In other embodiments the computing device 1500 is a mobile device, such as a Java-enabled cellular telephone or personal digital assistant (PDA), a smart phone, a digital audio player, or a portable media player. In some embodiments, the computing device 1500 includes a combination of devices, such as a mobile phone combined with a digital audio player or portable media player.

As shown in FIG. 5C, the central processing unit 1521 may include multiple processors P1, P2, P3, P4, and may provide functionality for simultaneous execution of instructions or for simultaneous execution of one instruction on more than one piece of data. In some embodiments, the computing device 1500 may include a parallel processor with one or more cores. In one of these embodiments, the computing device 1500 is a shared memory parallel device, with multiple processors and/or multiple processor cores, accessing all available memory as a single global address space. In another of these embodiments, the computing device 1500 is a distributed memory parallel device with multiple processors each accessing local memory only. In still another of these embodiments, the computing device 1500 has both some memory which is shared and some memory which may only be accessed by particular processors or subsets of processors. In still even another of these embodiments, the central processing unit 1521 includes a multicore microprocessor, which combines two or more independent processors into a single package, e.g., into a single integrated circuit (IC). In one exemplary embodiment, depicted in FIG. 5D, the computing device 1500 includes at least one central processing unit 1521 and at least one graphics processing unit 1521'.

In some embodiments, a central processing unit 1521 provides single instruction, multiple data (SIMD) functionality, e.g., execution of a single instruction simultaneously on multiple pieces of data. In other embodiments, several processors in the central processing unit 1521 may provide functionality for execution of multiple instructions simultaneously on multiple pieces of data (MIMD). In still other embodiments, the central processing unit 1521 may use any combination of SIMD and MIMD cores in a single device.

Figure 5E:
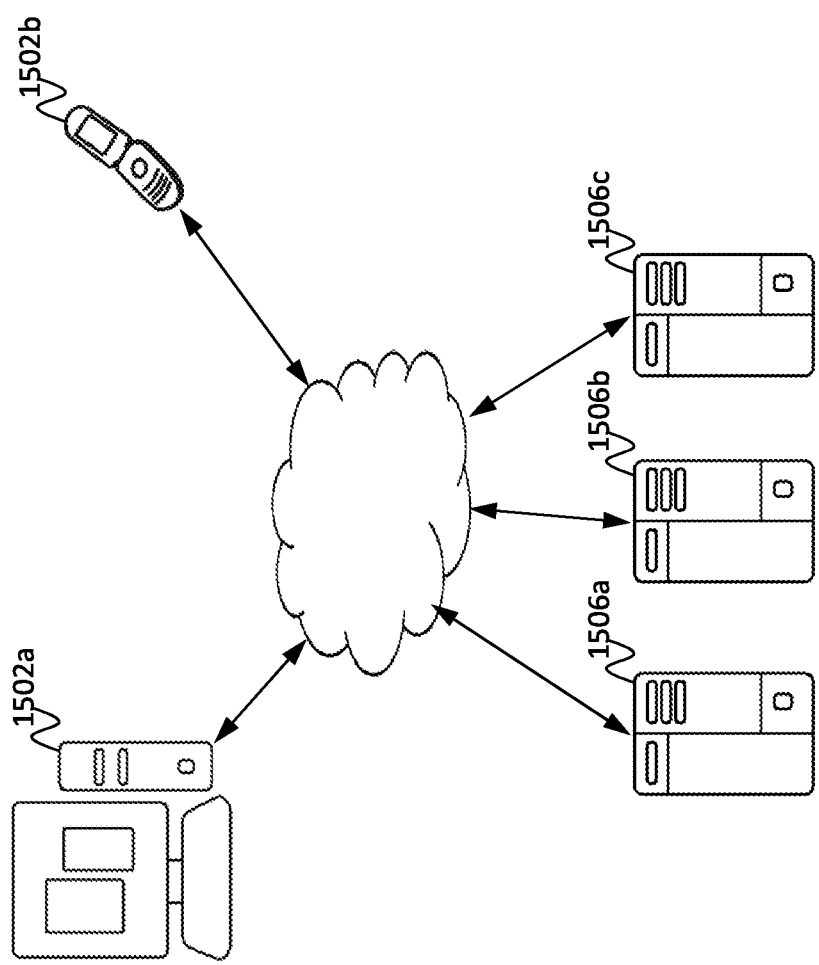
FIG. 5E is a block diagram of a network environment including several computing devices according to an embodiment of the present invention.

A computing device may be one of a plurality of machines connected by a network, or it may include a plurality of machines so connected. FIG. 5E shows an exemplary network environment. The network environment includes one or more local machines 1502a, 1502b (also generally referred to as local machine(s) 1502, client(s) 1502, client node(s) 1502, client machine(s) 1502, client computer(s) 1502, client device(s) 1502, endpoint(s) 1502, or endpoint node(s) 1502) in communication with one or more remote machines 1506a, 1506b, 1506c (also generally referred to as server machine(s) 1506 or remote machine(s) 1506) via one or more networks 1504. In some embodiments, a local machine 1502 has the capacity to function as both a client node seeking access to resources provided by a server machine and as a server machine providing access to hosted resources for other clients 1502a, 1502b. Although only two clients 1502 and three server machines 1506 are illustrated in FIG. 5E, there may, in general, be an arbitrary number of each. The network 1504 may be a local-area network (LAN), e.g., a private network such as a company Intranet, a metropolitan area network (MAN), or a wide area network (WAN), such as the Internet, or another public network, or a combination thereof.

The computing device 1500 may include a network interface 1518 to interface to the network 1504 through a variety of connections including, but not limited to, standard telephone lines, local-area network (LAN), or wide area network (WAN) links, broadband connections, wireless connections, or a combination of any or all of the above. Connections may be established using a variety of communication protocols. In one embodiment, the computing device 1500 communicates with other computing devices 1500 via any type and/or form of gateway or tunneling protocol such as Secure Socket Layer (SSL) or Transport Layer Security (TLS). The network interface 1518 may include a built-in network adapter, such as a network interface card, suitable for interfacing the computing device 1500 to any type of network capable of communication and performing the operations described herein. An I/O device 1530 may be a bridge between the system bus 1550 and an external communication bus.

According to one embodiment, the network environment of FIG. 5E may be a virtual network environment where the various components of the network are virtualized. For example, the various machines 1502 may be virtual machines implemented as a software-based computer running on a physical machine. The virtual machines may share the same operating system. In other embodiments, different operating system may be run on each virtual machine instance. According to one embodiment, a "hypervisor" type of virtualization is implemented where multiple virtual machines run on the same host physical machine, each acting as if it has its own dedicated box. Of course, the virtual machines may also run on different host physical machines.

Other types of virtualization is also contemplated, such as, for example, the network (e.g. via Software Defined Networking (SDN)). Functions, such as functions of the session border controller and other types of functions, may also be virtualized, such as, for example, via Network Functions Virtualization (NFV).

While the present invention has been described in connection with certain exemplary embodiments, it is to be understood that the invention is not limited to the disclosed embodiments, but, on the contrary, is intended to cover various modifications and equivalent arrangements included within the spirit and scope of the appended claims, and equivalents thereof.

What is claimed is:

1. A method for automatically managing a recorded interaction between a customer and an agent of a contact center, the method comprising:
    extracting, by a processor, features from the recorded interaction;
    computing, by the processor, a score of the recorded interaction by supplying the features to a prediction model, wherein the prediction model is configured to predict, automatically, the score that would be assigned in a manual evaluation of the recorded interaction, the prediction model being trained based on:
        a plurality of historical interactions;
        a plurality of features extracted from the historical interactions; and
        a plurality of manually generated scores corresponding to the historical interactions;
    detecting, by the processor, a condition based on the score;
    matching, by the processor, the condition with an action; and
    controlling, by the processor, a workforce management server to assign a training session to the agent of the contact center.

2. The method of claim 1, wherein the condition comprises comparing the score to a threshold corresponding to a failure to comply with agent performance standards.

3. The method of claim 2, wherein the threshold corresponds to a predicted performance based on historical performance of the agent.

4. The method of claim 2, wherein the threshold is based on a Gaussian distribution of agents of the contact center and the score is computed as a z-score being below the threshold.

5. The method of claim 2, wherein the score is an aggregate of a plurality of automatically computed scores of a plurality of recorded interactions, the plurality of recorded interactions occurring during a time window.

6. The method of claim 5, wherein the aggregate corresponds to a percentage of the recorded interactions during the time window that satisfy an individual interaction threshold condition, and
    wherein the threshold corresponds to a percentage of recorded interactions satisfying the individual interaction threshold condition.

7. The method of claim 1, wherein the training session is selected from a plurality of training topics in accordance with the condition detected based on the score.

8. The method of claim 7, wherein the score is associated with script compliance and the training session relates to script compliance.

9. The method of claim 7, wherein the score is associated with knowledge of a product line and the training session relates to information regarding the product line.

10. A system for automatically managing a recorded interaction between a customer and an agent of a contact center comprises:
    a processor; and a memory storing instructions that, when executed by the processor, cause the processor to:
extract features from the recorded interaction;
compute a score of the recorded interaction by supplying the features to a prediction model, wherein the prediction model is configured to predict, automatically, the score that would be assigned in a manual evaluation of the recorded interaction, the prediction model being trained based on:
a plurality of historical interactions;
a plurality of features extracted from the historical interactions; and
a plurality of manually generated scores corresponding to the historical interactions;
detect a condition based on the score;
match the condition with an action; and
control a workforce management server to assign a training session to the agent of the contact center.

11. The system of claim 10, wherein the condition comprises comparing the score to a threshold corresponding to a failure to comply with agent performance standards.

12. The system of claim 11, wherein the threshold corresponds to a predicted performance based on historical performance of the agent.

13. The system of claim 11, wherein the threshold is based on a Gaussian distribution of agents of the contact center and the score is computed as a z-score being below the threshold.

14. The system of claim 11, wherein the score is an aggregate of a plurality of automatically computed scores of a plurality of recorded interactions, the plurality of recorded interactions occurring during a time window.

15. The system of claim 14, wherein the aggregate corresponds to a percentage of the recorded interactions during the time window that satisfy an individual interaction threshold condition, and wherein the threshold corresponds to a percentage of recorded interactions satisfying the individual interaction threshold condition.

16. The system of claim 10, wherein the training session is selected from a plurality of training topics in accordance with the condition detected based on the score.

17. The system of claim 16, wherein the score is associated with script compliance and the training session relates to script compliance.

18. The system of claim 16, wherein the score is associated with knowledge of a product line and the training session relates to information regarding the product line.

19. A system for automatically managing a recorded interaction between a customer and an agent of a contact center comprising:
means for extracting features from the recorded interaction;
means for computing a score of the recorded interaction by supplying the features to a prediction model, wherein the prediction model is configured to predict, automatically, the score that would be assigned in a manual evaluation of the recorded interaction, the prediction model being trained based on:
a plurality of historical interactions;
a plurality of features extracted from the historical interactions; and
a plurality of manually generated scores corresponding to the historical interactions;
means for detecting a condition based on the score;
means for matching the condition with an action; and
means for controlling a workforce management server to assign a training session to the agent of the contact center.

20. The system of claim 19, wherein the condition comprises comparing the score to a threshold corresponding to a failure to comply with agent performance standards.

* * * * *